United States Patent
Klejeski et al.

(10) Patent No.: US 8,365,520 B2
(45) Date of Patent: Feb. 5, 2013

(54) SYSTEM AND METHOD FOR AUXILARY POWER UNIT EMISSIONS MANAGEMENT

(75) Inventors: Anthony T. Klejeski, Bethel, MN (US); Ronald J. Mellum, Delano, MN (US); Lowell K. Siewert, Brooklyn Park, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 889 days.

(21) Appl. No.: 12/378,484

(22) Filed: Feb. 13, 2009

(65) Prior Publication Data

US 2009/0223210 A1 Sep. 10, 2009

Related U.S. Application Data

(60) Provisional application No. 61/065,905, filed on Feb. 15, 2008.

(51) Int. Cl.
| | |
|---|---|
| *F01N 1/00* | (2006.01) |
| *F01N 3/00* | (2006.01) |
| *F01B 21/04* | (2006.01) |
| *F01K 23/00* | (2006.01) |
| *F02B 73/00* | (2006.01) |
| *F02B 25/00* | (2006.01) |

(52) U.S. Cl. ............... 60/324; 60/287; 60/297; 60/698; 60/706

(58) Field of Classification Search .................... 60/274, 60/277, 287, 288, 297, 299, 324, 698, 706, 60/716

See application file for complete search history.

(56) References Cited

U.S. PATENT DOCUMENTS

| 4,531,379 | A | * | 7/1985 | Diefenthaler, Jr. | 62/236 |
|---|---|---|---|---|---|
| 4,611,466 | A | * | 9/1986 | Keedy | 60/714 |
| 5,964,088 | A | * | 10/1999 | Kinugasa et al. | 60/286 |
| 6,321,533 | B1 | * | 11/2001 | Watanabe et al. | 60/324 |
| 7,104,051 | B2 | | 9/2006 | Shimasaki et al. | |
| 7,216,480 | B2 | * | 5/2007 | Suzuki et al. | 60/285 |
| 7,308,883 | B2 | * | 12/2007 | Suzuki | 123/198 R |
| 7,392,652 | B2 | * | 7/2008 | Heath | 60/297 |
| 7,624,569 | B2 | * | 12/2009 | Driscoll et al. | 60/285 |
| 2004/0128985 | A1 | | 7/2004 | Shimasaki et al. | |
| 2004/0226287 | A1 | | 11/2004 | Edgar et al. | |
| 2006/0168951 | A1 | | 8/2006 | Opris | |
| 2006/0168952 | A1 | | 8/2006 | Opris | |
| 2006/0174609 | A1 | | 8/2006 | Heath | |
| 2008/0295494 | A1 | * | 12/2008 | Driscoll et al. | 60/286 |

FOREIGN PATENT DOCUMENTS

| JP | 17-180336 A | 7/2005 |
|---|---|---|
| JP | 18-077715 A | 3/2006 |
| JP | 18-274935 A | 10/2006 |
| WO | WO 2008-015399 A1 | 2/2008 |

* cited by examiner

*Primary Examiner* — Kenneth Bomberg
*Assistant Examiner* — Audrey K Bradley
(74) *Attorney, Agent, or Firm* — Krieg DeVault LLP

(57) ABSTRACT

A system is disclosed including a primary engine that provides vehicle propulsion and a secondary engine that drives a generator to provide auxiliary power. The system further includes a first exhaust gas passageway from the primary engine and a second exhaust gas passageway from the secondary engine. The system further includes an emission treatment device including an exhaust inlet to treat exhaust from the primary and secondary engines. The system further includes an exhaust routing device that selectively routes exhaust from the first passageway or the second passageway to the exhaust inlet. The exhaust routing device at least partially blocks the first passageway or the second passageway from fluid communication with the exhaust inlet.

20 Claims, 6 Drawing Sheets

SYSTEM AND METHOD FOR AUXILARY POWER UNIT EMISSIONS MANAGEMENT

RELATED APPLICATIONS

The present application claims the benefit of U.S. provisional patent application No. 61/065,905 filed on Feb. 15, 2008, which is hereby incorporated by reference in its entirety.

BACKGROUND

The present application relates to engine aftertreatment systems, and more particularly, but not exclusively, relates to an aftertreatment system for an auxiliary power unit engine carried on a vehicle.

In certain applications, a vehicle engine idles for extended periods of time to provide electrical power to accessories. This operation can generate significant amounts of unnecessary emissions because the idling engine is sized to provide propulsive power for the vehicle, which is much greater than that needed to power the accessories. To address this drawback, some vehicles include a secondary engine in a genset dedicated to powering the accessories. Typically, this secondary engine can be smaller than the engine used to propel the vehicle, and correspondingly has lower exhaust emissions that have not been subject to aftertreatment. However, even a smaller engine benefits from having aftertreatment to reduce exhaust emissions, as the untreated exhaust of a smaller engine can exceed desired emissions levels. Unfortunately, for typical applications, an aftertreatment system dedicated to the secondary engine can be cost prohibitive and/or the aftertreatment system dedicated to the secondary engine can be cost prohibitive and/or the engine cannot practically provide the conditions needed to periodically regenerate typical aftertreatment systems. Accordingly, there is a demand for further contributions in this area of technology.

SUMMARY

One embodiment of the present application is a unique engine aftertreatment system. Other embodiments include unique methods, systems, devices, and apparatus involving exhaust emissions control. Further objects, forms, embodiments, benefits, advantages, features, and aspects of the present application shall become apparent from the description and drawings contained herein.

DETAILED DESCRIPTION

Figure 1:
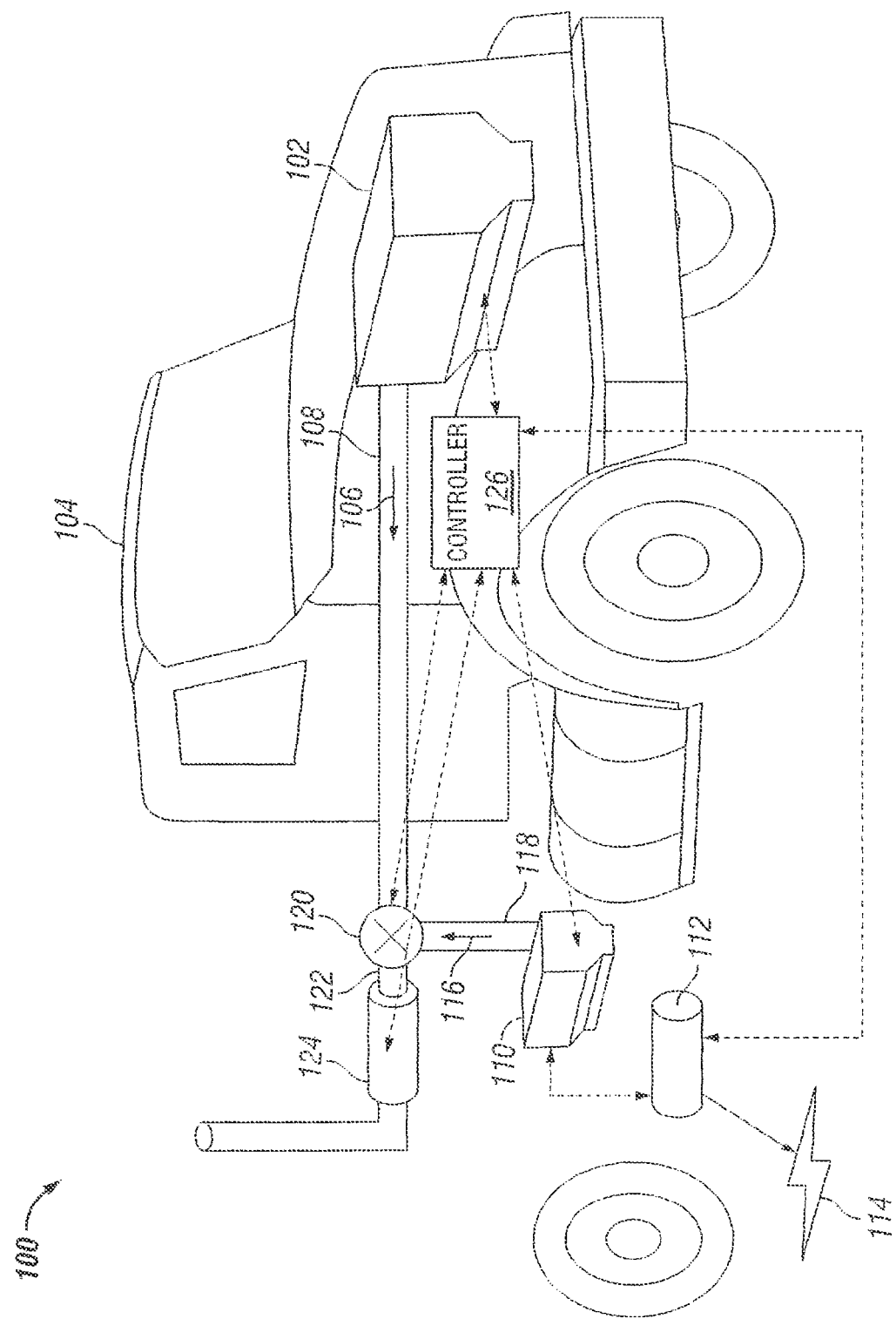
FIG. 1 is a schematic block diagram illustrating a system for auxiliary power unit emissions management.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the illustrated or described embodiments, and further applications of the principles of the application as would normally occur to one skilled in the art to which the invention relates are contemplated and protected.

FIG. 1 is a schematic block diagram illustrating a system 100 for auxiliary power unit emissions management. The system 100 includes a first internal combustion engine 102 to provide propulsion to a vehicle 104. In certain embodiments, the first internal combustion engine 102 is a primary internal combustion engine that produces a first exhaust stream 106 during operation. The system 100 includes a first exhaust passageway 108 coupled to the first engine 102, and the first exhaust stream 106 flows through the first exhaust passageway 108. The system 100 further includes an electric power source that may include a second internal combustion engine 110, and an electric power generator 112, where the second internal combustion engine 110 drives the generator 112 to produce electric power 114. The second internal combustion engine 110 may be a secondary internal combustion engine producing a second exhaust stream 116 during operation. The system 100 includes a second exhaust passageway 118 coupled to the second engine 110, and the second exhaust stream 116 flows through the second exhaust passageway 118.

The system 100 further includes an exhaust routing device 120 to selectively route exhaust 106, 116 to an exhaust inlet 122 from one of the first passageway 108 and the second passageway 118. The exhaust routing device 120 is structured to at least partially close the first passageway 108 and/or the second passageway 118 from fluid communication with the exhaust inlet 122. In certain embodiments, the exhaust routing device 120 is structure to alternately route the first exhaust stream 106 and the second exhaust stream 116 through an emissions treatment device 124. In certain embodiments, the exhaust routing device 120 is structured to block fluid communication between the exhaust inlet 122 and the second passageway 118 when the first engine 102 is operating. In certain embodiments, the exhaust routing device 120 is structured to block fluid communication between the exhaust inlet 122 and the first passageway 108 when the second engine 110 is operating.

In certain embodiments, the exhaust routing device 120 includes an actuator structured to operate a first valve corresponding to the first passageway 108 and a second valve corresponding to the second passageway 118. The actuator may be a single actuator that operates both valves simultaneously. In certain further embodiments, the actuator in a first position opens the first valve and closes the second valve, and the actuator in a second position opens the second valve and closes the first valve.

In certain embodiments, the vehicle 104 carries the first internal combustion engine 102, the electric power source including the second internal combustion engine 110 and the generator 112, the emission treatment device 124, and the exhaust routing device 120. In certain embodiments, the electric power source is an auxiliary power unit (APU) that powers devices on the vehicle 104 during periods where the first internal combustion engine 102 is turned off. In certain embodiments, the system 100 further includes an electric power source actuator (not shown) that starts the second engine 110. The electric power source actuator is configured to provide a position signal to a controller 126 indicating whether the second engine 110 is being started. The electric power source actuator may be a button, switch, keyswitch, or other starting device understood in the art. The electric power source actuator may provide a signal to the controller 126 through an electrical signal, a datalink communication, or other signal device understood in the art.

In certain embodiments, the system 100 further includes the controller 126 that functionally executes some operations for APU emissions management. The controller 126 may be a computer device including a memory and a processor of any type understood in the art. The controller 126 may comprise a single device or a plurality of distributed devices, each device performing one or more operations for APU emissions management, with the various devices of the controller 126 operating independently and/or in communication. The controller 126 may include modules configured to functionally execute the operations of the controller 126, and the modules may be hardware, firmware, software, and/or logic operating on or in conjunction with the controller 126. In certain embodiments, the controller 126 includes an input module, a control module, and a diagnostic module.

In certain embodiments, the emission treatment device 124 includes a particulate filter that traps at least a portion of particulates in the exhaust inlet 122. The emission treatment device 124 may include a particulate filter, an oxidation catalyst, a $NO_x$ treatment catalyst, and/or any other emission treatment device 124 understood in the art.

Figure 2:
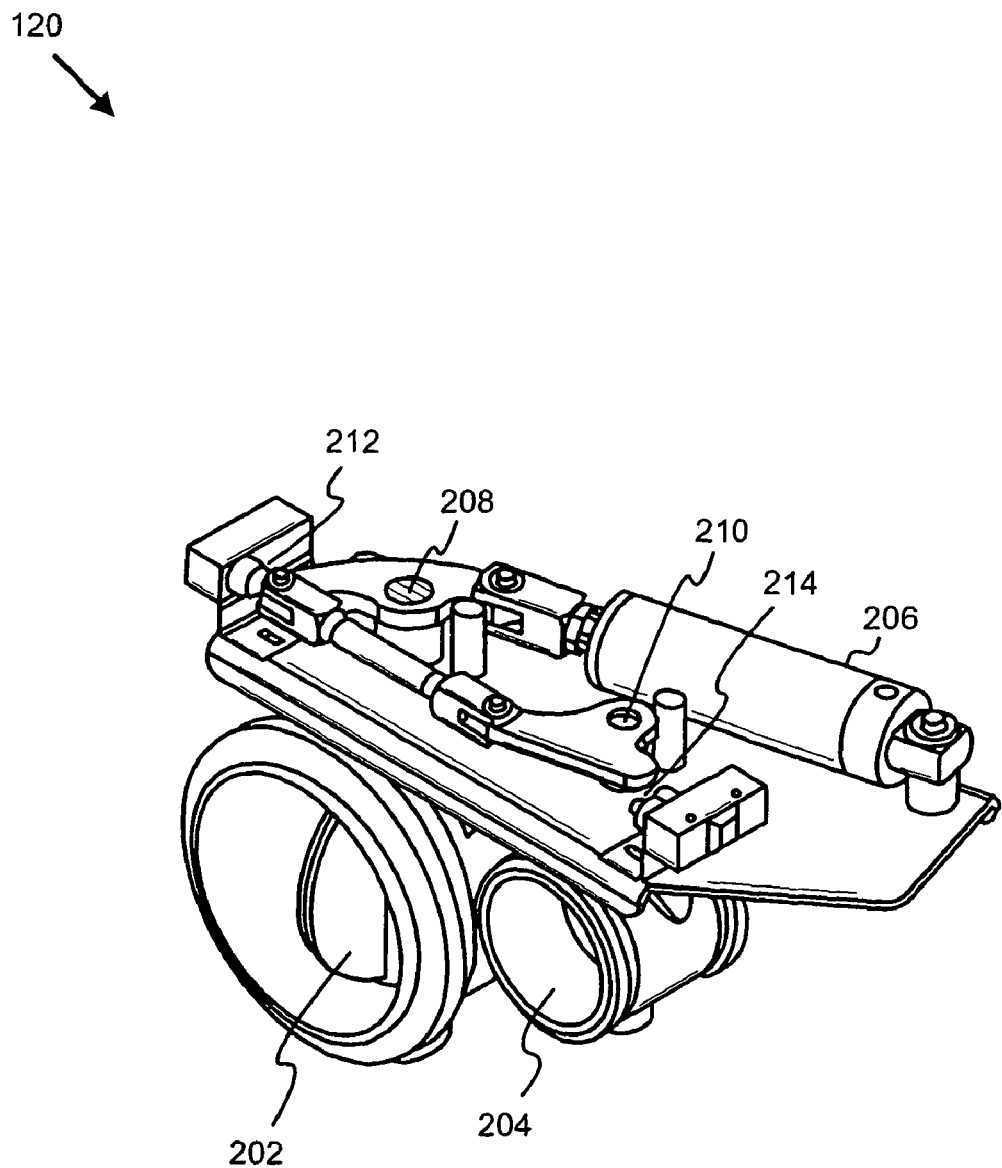
FIG. 2 is a perspective view of an exhaust routing device.

FIG. 2 is a schematic diagram illustrating an exhaust routing device 120. The exhaust routing device 120 includes a first valve 202 that couples the first exhaust passageway 108 to the exhaust inlet 122 and a second valve 204 that couples the second exhaust passageway 118 to the exhaust inlet 122. The exhaust routing device 120 utilizes the valves 202, 204 to selectively couple the first exhaust passageway 108 and/or the second exhaust passageway 118 to the exhaust inlet 122. In certain embodiments, the exhaust routing device 120 may include a single three-way valve (not shown) or similar device to selectively couple the first exhaust passageway 108 and/or the second exhaust passageway 118 to the exhaust inlet 122.

In certain embodiments, the exhaust routing device 120 includes an actuator 206 that structured to operate the first valve 202 and the second valve 204. In certain embodiments, a single actuator 206 operates both valves 202, 204 although embodiments with multiple actuators are contemplated within the scope of the present application. In the embodiment illustrated in FIG. 2, the actuator 206 pivots a first axis 208 rotating the first valve 202, and pivots a second axis 210 rotating the second valve 204.

In certain embodiments, the exhaust routing device 120 includes a first limit switch 212 that provides a first valve open signal in response to the first valve 202 being fully open. In the embodiment illustrated in FIG. 2, the actuator 206 presses the first limit switch when the actuator 206 is positioned such that the first valve 202 is open. Any arrangement of the first limit switch 212 that confirms the first valve 202 is open is contemplated within the present application. The first limit switch 212 provides the first valve open signal to the controller 126 through an electrical signal, a datalink communication, or other signal device understood in the art.

In certain embodiments, the exhaust routing device 120 includes a second limit switch 214 that provides a second valve open signal in response to the second valve 204 being fully open. In the embodiment illustrated in FIG. 2, the actuator 206 presses the second limit switch when the actuator 206 is positioned such that the second valve 204 is open. Any arrangement of the second limit switch 214 that confirms the second valve 204 is open is contemplated within the present application. The second limit switch 214 provides the second valve open signal to the controller 126 through an electrical signal, a datalink communication, or other signal device understood in the art.

In certain embodiments, the exhaust routing device 120 includes a biasing member that moves the actuator 206 to a first position wherein the first valve 202 is open as a default position. In the embodiment illustrated in FIG. 2, the biasing member is a spring incorporated within the actuator 206, but any biasing member known in the art is understood to be contemplated within the present application. In certain embodiments, the actuator 206 includes a double acting ram, for example as illustrated in FIG. 2.

Figure 3:
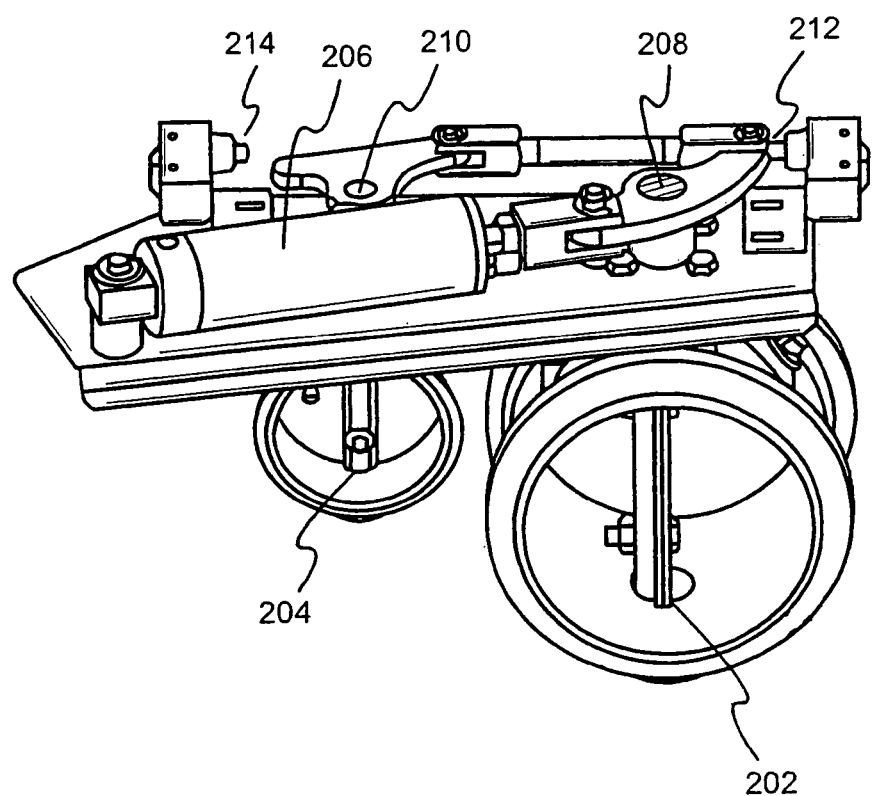
FIG. 3 is a perspective view of the device of FIG. 2 in one operating configuration.

FIG. 3 is a schematic diagram illustrating an exhaust routing device 120 in a first position. In the illustration of FIG. 3, the first valve 202 is open and the second valve 204 is closed. The first limit switch 212 is contacted by the actuator 206 and provides a first valve open signal to the controller 126 in response to the first valve 202 being open. The first valve 202 provides fluid communication between the first exhaust passageway 108 and the exhaust inlet 122, while the second valve 204 at least partially blocks the second exhaust passageway 118.

Figure 4:
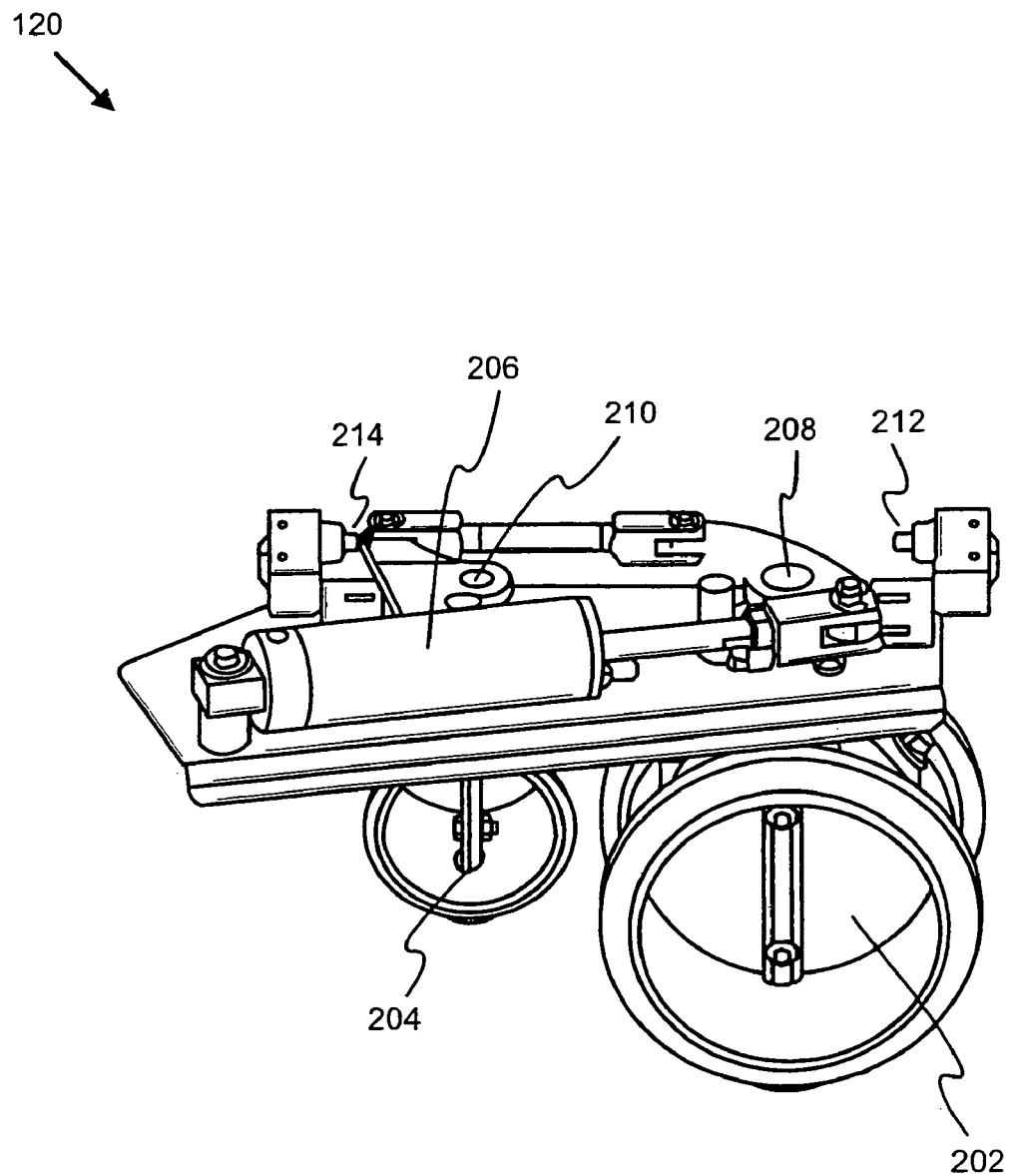
FIG. 4 is a perspective view of the device of FIG. 2 in an alternative operating configuration.

FIG. 4 is a schematic diagram illustrating an exhaust routing device 120 in a second position. In the illustration of FIG. 4, the second valve 204 is open and the first valve 202 is closed. The second limit switch 214 is contacted by the actuator 206 and provides a second valve open signal to the controller 126 in response to the second valve 204 being open. The second valve 204 provides fluid communication between the second exhaust passageway 118 and the exhaust inlet 122, while the first valve 202 at least partially blocks the first passageway 108.

Figure 5:
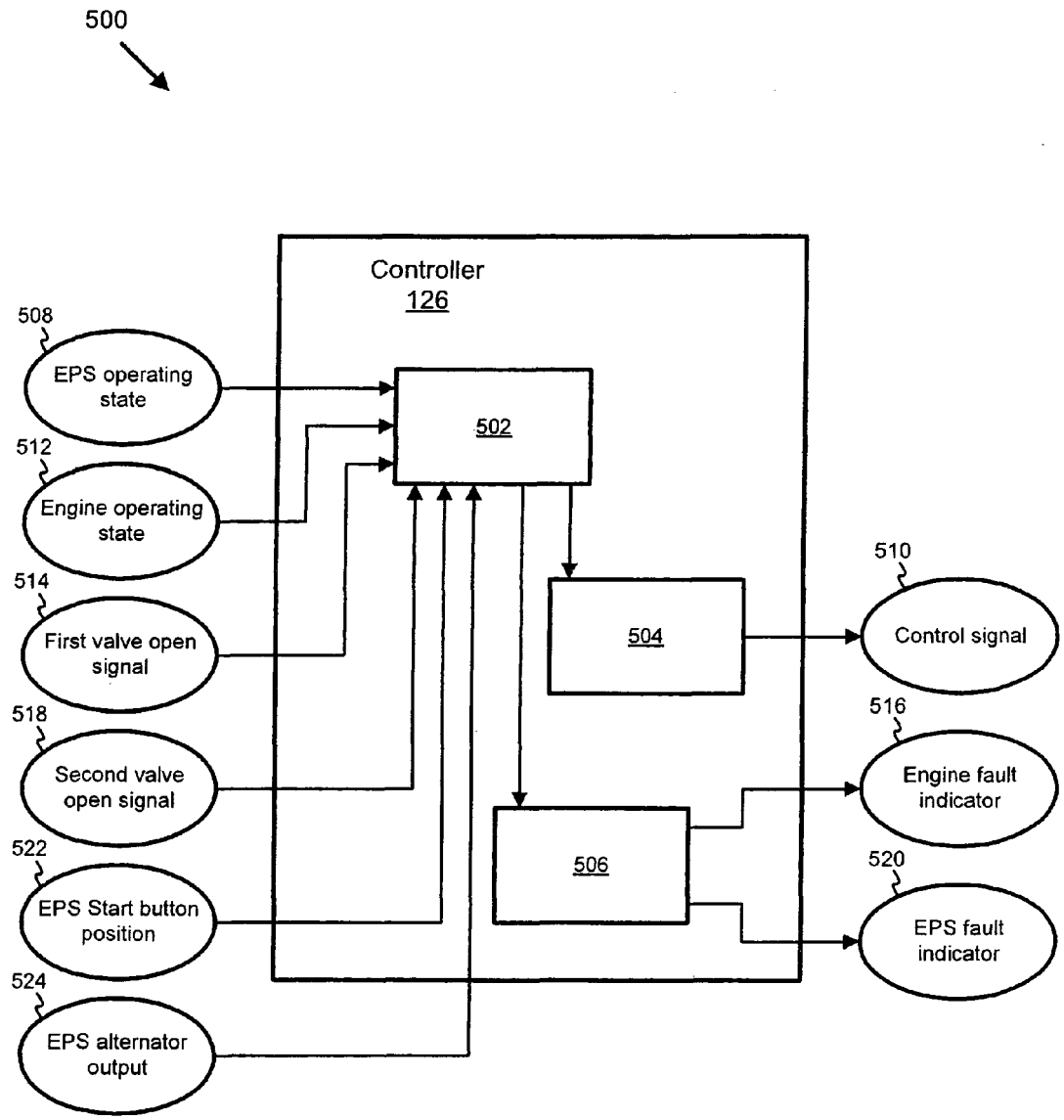
FIG. 5 is a schematic block diagram illustrating a controller that executes a procedure for auxiliary power unit emissions management.

FIG. 5 is a schematic block diagram illustrating a controller 126 that executes a procedure for auxiliary power unit emissions management. In certain embodiments, the controller 126 includes an input module 502, a control module 504, and a diagnostic module 506. In certain embodiments, the input module 502 interprets an electric power source operating state 508 and determines whether the electric power source is in a non-operating state or an operating state, and the control module 504 generates a corresponding control signal 510. In certain embodiments, the actuator 206 is responsive to the control signal 510 to change position if the electric power source changes between the non-operating state and the operating state. For example, the electric power source may transition from OFF to ON, the input module 502 detects the transition, the control module 504 transitions the control signal 510 from FIRST to SECOND, and the actuator 206 transitions from the first position (e.g. see FIG. 3) to the second position (e.g. see FIG. 4) in response to the control signal 510. The naming conventions, actuator 206 positions, and electric power source states described herein are exemplary only.

In certain embodiments, the input module 502 interprets an engine operating state 512 and a first valve open signal 514, and the diagnostic module 506 provides an engine fault indicator 516 in response to the engine operating state 512 indicating a run state and the first valve open signal 514 indicating the first valve 202 is not open. For example, the primary engine 102 may be in a RUN state, but debris has jammed the actuator 206 in a position where the first valve 202 is unable to open. In the example, the first limit switch 212 is not contacted by the actuator 206, and the input module 502 determines that the engine operating state 512 is a RUN state, but that the first valve open signal 514 indicates that the first valve 202 is not open. In the example, the diagnostic module 506 provides an engine fault indicator 516.

In certain embodiments, the input module 502 interprets the electric power source operating state 508 and a second valve open signal 518, and the diagnostic module 506 provides an electric power source fault indicator 520 in response to the electric power source operating state 508 indicating one of a run state and a start state and the second valve open signal 518 indicating the second valve 204 is not open. For example, the secondary engine 110 may be in a START state and/or a RUN state, but an electrical failure prevents the actuator 206 from opening the second valve 204. In the example, the second limit switch 214 is not contacted by the actuator 206, and the input module 502 determines that the electric power source operating state 508 is a START and/or RUN state, but that the second valve open signal 518 indicates that the second valve 204 is not open. In the example, the diagnostic module 506 provides an electric power source fault indicator 520. In certain embodiments, the controller 126 prevents operation of the secondary engine 110 in response to the engine fault indicator 516 and/or in response to the electric power source fault indicator 520.

In certain embodiments, the input module 502 interprets the engine operating state 512, an electric power source start actuator position 522, an electric power source alternator output 524, and a second valve open signal 518. In certain further embodiments, the control module 504 controls the single actuator 206 to the second position in response to one of a first condition and a second condition. In certain embodiments, the first condition includes the electric power source start actuator position 522 indicating an electric power source start attempt and the engine operating state 512 indicating that the primary engine 102 is off. In certain embodiments, the second condition includes the electric power source alternator output 524 indicating voltage output 114, the second valve open signal 518 indicating that the second valve 104 is open, and the engine operating state 512 indicating that the primary engine 102 is off. In certain embodiments, the controller 126 controls the actuator 206 to the second position when the primary engine 102 is off and the electric power source start actuator position 522 indicates a start request, and the controller 126 keeps the actuator 206 in the second position while the primary engine 102 remains off, while the actuator 206 maintains the second position, and while the generator 112 is producing a voltage output 114.

Figure 6:
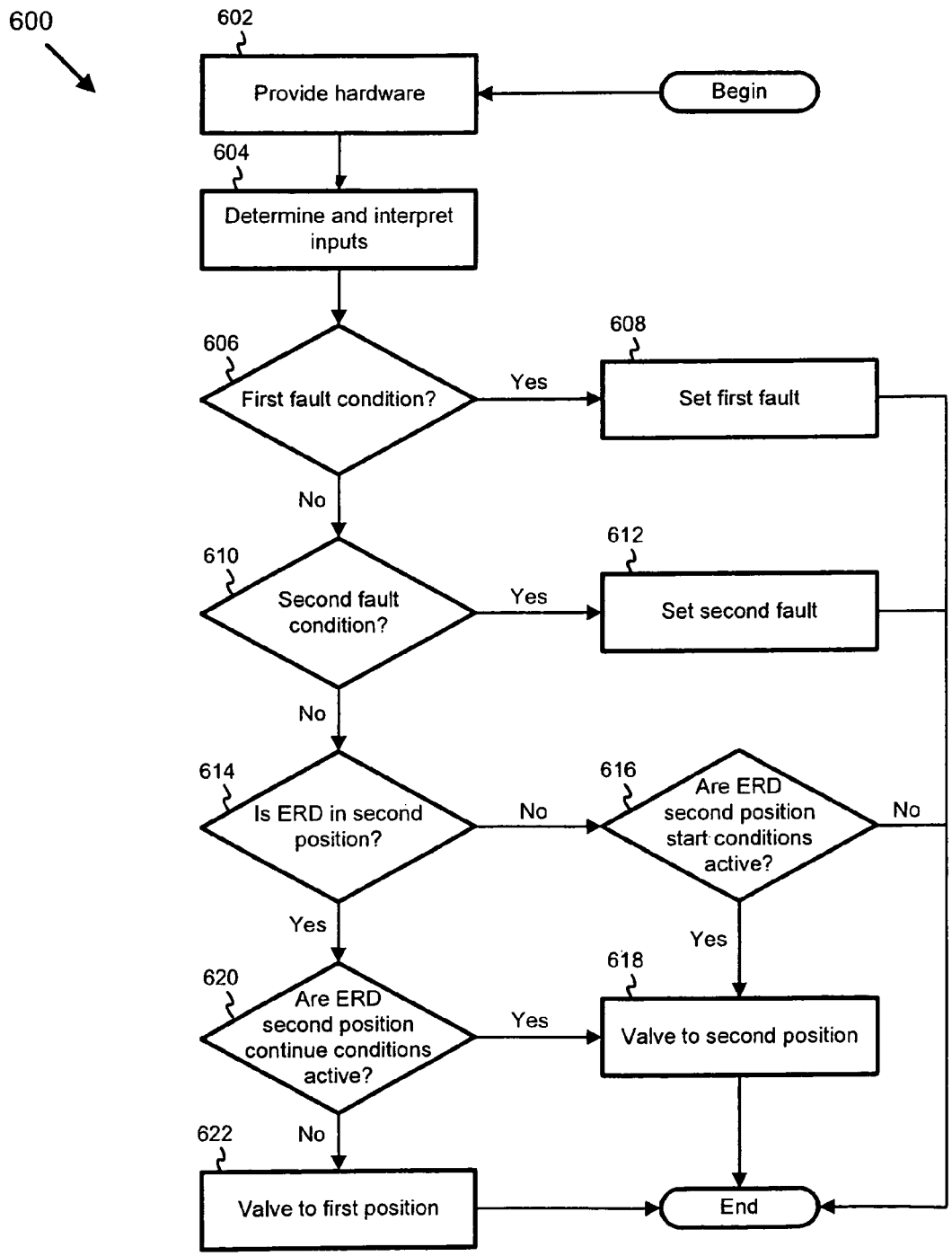
FIG. 6 is a schematic flow diagram illustrating a routine for auxiliary power unit emissions management.

The illustration of FIG. 6 and the related descriptions that follow are exemplary and numerous other variations are contemplated. For example, operations may be modified, combined, or subdivided, and different variables, states, events, conditionals, tests, logics, systems, flow charts and/or algorithms are contemplated. Furthermore, portions and/or combinations of the illustrated and described charts and algorithms and/or variations thereof may be present in various embodiments, although no portion, whole, or combination need necessarily be present. Also, the operations may reside in hardware, software, firmware, logic or combinations or portions thereof and may be run, processed, executed, loaded and/or stored in whole or part, in or on different components, devices, or codes, separately, simultaneously, concurrently, and/or in a time or resource sharing configuration or various combinations thereof. Operations may be performed as a computer program product operating on a computer readable medium.

FIG. 6 is a schematic flow diagram illustrating a routine 600 for auxiliary power unit emissions management. The routine 600 includes an operation 602 to provide a primary internal combustion engine 102, an electric power source including an electric power generator 112 and a secondary internal combustion engine 110, and an exhaust routing device 120. In certain embodiments, the routine 600 includes operations 604 to interpret an electric power source operating state 508, an engine operating state 512, a first valve open signal 514, a second valve open signal 518, an electric power source start actuator position 522, and an electric power source alternator output 524. In certain embodiments, the routine 600 includes a conditional operation 606 to determine a first fault condition, wherein the first fault condition is true if a control condition (e.g. the control signal 510) indicates the exhaust routing device 120 should be in the first position, and the first valve open signal 514 indicates the exhaust routing device 120 is not in the first position. In certain embodiments, if the first fault condition is true, the routine 600 includes an operation 608 that sets a first fault, for example an engine fault indicator 516, and the routine 600 exits.

In certain embodiments, if the first fault condition is not true, the routine 600 includes a conditional operation 610 to determine a second fault condition, wherein the second fault condition is true if a control condition (e.g. the control signal 510) indicates the exhaust routing device 120 should be in the second position, and the second valve open signal 518 indicates the exhaust routing device 120 is not in the second position. In certain embodiments, if the second fault condition is true, the routine 600 include an operation 612 that sets a second fault, for example the electronic power source indicator fault 520, and the routine 600 exits.

In certain embodiments, if the second fault condition is not true, the routine 600 includes a conditional operation 614 to determine whether the exhaust routine device 120 is in the second position. If the exhaust routing device 120 is not in the second position, the routine 600 includes conditional operations 616 to determine whether system 100 conditions exist wherein the exhaust routing device 120 should be moved to the second position. If the exhaust routing device 120 should be moved to the second position—for example in one embodiment if the engine operating state 512 indicates the primary engine 102 is off and the electronic power source start actuator position 522 indicates an attempt to start the secondary engine 110—the routine 600 includes operations 618 to control the exhaust routing device 120 to the second position.

If the exhaust routing device 120 is in the second position, the routine 600 includes conditional operations 620 to determine whether system 100 conditions exist wherein the exhaust routing device 120 should remain in the second position, for example in one embodiment if the engine operating state 512 indicates the primary engine 102 is off, the electric power source alternator output 524 indicates the generator 112 is generating a voltage output 114, and the second valve open signal 518 indicates that the exhaust routing device 120 is in the second position. If the exhaust routing device 120 should remain in the second position, the routine 600 includes the operation 618 to control the exhaust routing device 120 to the second position. If the exhaust routing device 120 should not remain in the second position, the routine 600 includes operations 622 to move the exhaust routing device 120 to the first position.

As is evident from the figures and text presented above, a variety of embodiments of the present application are contemplated. Certain exemplary embodiments include a system, method, and apparatus for providing auxiliary power unit emissions management.

An exemplary embodiment includes a system having a first internal combustion engine to provide vehicular propulsion, a first exhaust passageway coupled to the first engine, an electric power generator, a second internal combustion engine to drive the generator to produce electricity, a second exhaust passageway coupled to the second engine, an emission treatment device including an exhaust inlet to treat exhaust from the first engine and the second engine, and an exhaust routing device to selectively route exhaust to the exhaust inlet from one of the first passageway and the second passageway, the exhaust routing device being structured to at least partially close one of the first exhaust passageway and the second exhaust passageway from fluid communication with the exhaust inlet.

In certain exemplary embodiments, the system further includes a vehicle carrying the first internal combustion engine, the electric power source, the emission treatment device, and the exhaust routing device. In certain exemplary embodiments, the system further includes the exhaust routing device structured to block the fluid communication between the exhaust inlet and the second passageway when the first engine is operating and to block the fluid communication between the exhaust inlet and the first passageway when the second engine is operating. In certain exemplary embodiments, the system further includes the exhaust routing device including an actuator structured to operate a first valve corresponding to the first passageway and a second valve corresponding to the second passageway.

In certain exemplary embodiments, the system further includes the actuator further including a first position wherein the first valve is open and the second valve is closed, and a second position wherein the first valve is closed and the second valve is open. In certain exemplary embodiments, the system further includes a first limit switch adapted to provide a first valve open signal in response to the first valve being fully open. In certain exemplary embodiments, the system further includes a second limit switch adapted to provide a second valve open signal in response to the second valve being fully open. In certain exemplary embodiments, the system further includes the exhaust routing device further including a biasing means that moves the actuator to the first position as a default position, and the actuator includes a double acting ram. In certain exemplary embodiments, the system further includes the emission treatment device comprising a particulate filter.

In certain exemplary embodiments, a system includes a primary internal combustion engine producing a first exhaust stream during operation, an electric power source including an electric power generator and a secondary internal combustion engine to drive the generator, the secondary combustion engine producing a second exhaust stream during operation, an exhaust routing device structured to alternately route the first exhaust stream and the second exhaust stream through an emission treatment device, and a controller structured to determine whether the electric power source is in one of a non-operating state and an operating state and generate a corresponding control signal; wherein the actuator is responsive to the control signal to change position if the electric power source changes between the non-operating state and the operating state.

In certain further embodiments, the controller is further structured to interpret an engine operating state and a first valve open signal, and wherein the controller is further structured to provide an engine fault indicator in response to the engine operating state indicating a run state and the first valve open signal indicating the first valve is not open. In certain further embodiments, the controller is further structured to interpret an electric power source operating state and a second valve open signal, and the controller is further structured to provide an electric power source fault indicator in response to the electric power source operating state indicating one of a run state and a start state and the second valve open signal indicating the second valve is not open. In certain embodiments, the controller is further structured to interpret an engine operating state, an electric power source start actuator position, an electric power source alternator output, and a second valve open signal, and control the single actuator to the second position in response to at least one of: the electric power source start actuator position indicating an electric power source start attempt and the engine operating state indicating an off state, and the electric power source alternator output indicating voltage output, the second valve open signal indicating the second valve is open, and the engine operating state indicating an off state.

In certain exemplary embodiments, a method includes providing a primary internal combustion engine producing a first exhaust stream during operation, providing an electric power source including an electric power generator and a secondary internal combustion engine to drive the generator, the secondary combustion engine producing a second exhaust stream during operation, providing an exhaust routing device, the exhaust routing device having a first position wherein the first exhaust stream flows through a particulate filter and the second exhaust stream is blocked, and the exhaust routing device having a second position wherein the first exhaust stream is blocked and the second exhaust stream flows through the particulate filter, interpreting an electric power source operating state, and holding the exhaust routing device in the second position in response to the electric power source operating state being a starting state.

In certain further embodiments, the method includes determining an output value of an alternator of the electric power source, determining a limit switch condition, determining the primary internal combustion engine operating condition, and continuing to hold the exhaust routing device in the second position in response to: the output value of the alternator, the limit switch condition indicating the exhaust routing device is fully in the second position, and the primary internal combustion engine operating condition indicating the primary internal combustion engine is off.

In certain further embodiments, the method includes providing a first limit switch that determines whether the exhaust routing device is fully in the first position, determining whether a control condition indicates the exhaust routing device should be in the first position, and providing a fault indicator in response to the control condition indicating the exhaust routing device should be in the first position and the first limit switch indicating the exhaust routing device is not fully in the first position. In certain further embodiments, the method includes providing a second limit switch that determines whether the exhaust routing device is fully in the second position, determining whether a control condition indicates the exhaust routing device should be in the second position, and providing a fault indicator in response to the control condition indicating the exhaust routing device should be in the second position and the second limit switch indicating the exhaust routing device is not fully in the second position.

In certain exemplary embodiments, an apparatus includes a first internal combustion engine to provide vehicular propulsion, a first exhaust passageway coupled to the first engine, an electric power generator, a second internal combustion engine to drive the generator to produce electricity, a second exhaust passageway coupled to the second engine, an emission treatment device including an exhaust inlet to treat exhaust from the first engine and the second engine, and means for selectively routing exhaust to the exhaust inlet from one of the first passageway and the second passageway through an emissions reduction device.

In certain further embodiments, the means for selectively routing exhaust to the exhaust inlet from one of the first passageway and the second passageway through an emissions reduction device includes at least one valve, and the apparatus further includes a valve detection means that determines the position of the at least one valve, and a fault determination means that provides a fault indicator when the position of the at least one valve and a commanded position of the at least one valve are not in agreement. In certain further embodiments, the apparatus further includes a means for preventing operation of the second emissions source in response to the fault indicator.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred, more preferred or exemplary utilized in the description above indicate that the feature so described may be more desirable or characteristic, nonetheless may not be necessary and embodiments lacking the same may be contemplated as within the scope of the invention, the scope being defined by the claims that follow. In reading the claims, it is intended that when words such as "a," an, "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a primary internal combustion engine producing a first exhaust stream during operation;
an electric power source including an electric power generator and a secondary internal combustion engine to drive the generator, the secondary combustion engine producing a second exhaust stream during operation;
an exhaust valve device structured to alternately route the first exhaust stream and the second exhaust stream through an emission treatment device; and
a controller structured to determine whether the electric power source is in one of a non-operating state and an operating state and generate a corresponding control signal; wherein the actuator is responsive to the control signal to change position if the electric power source changes between the non-operating state and the operating state.

2. The system of claim 1, wherein the controller is further structured to interpret an engine operating state and a first valve open signal, and wherein the controller is further structured to provide an engine fault indicator in response to the engine operating state indicating a run state and the first valve open signal indicating the first valve is not open.

3. The system of claim 1, wherein the controller is further structured to interpret an electric power source operating state and a second valve open signal, and wherein the controller is further structured to provide an electric power source fault indicator in response to the electric power source operating state indicating one of a run state and a start state and the second valve open signal indicating the second valve is not open.

4. The system of claim 1, wherein the controller is further structured to:
interpret an engine operating state, an electric power source start actuator position, an electric power source alternator output, and a second valve open signal; and
control the single actuator to the second position in response to at least one of:
the electric power source start actuator position indicating an electric power source start attempt and the engine operating state indicating an off state; and
the electric power source alternator output indicating voltage output, the second valve open signal indicating the second valve is open, and the engine operating state indicating an off state.

5. A method, comprising:
providing a primary internal combustion engine producing a first exhaust stream during operation;
providing an electric power source including an electric power generator and a secondary internal combustion engine to drive the generator, the secondary combustion engine producing a second exhaust stream during operation;
providing an exhaust valve device, the exhaust valve device having a first position wherein the first exhaust stream flows through a particulate filter and the second exhaust stream is blocked from flow through the particulate filter, and the exhaust valve device having a second position wherein the first exhaust stream is blocked from flow through the particulate filter and the second exhaust stream flows through the particulate filter;
interpreting an electric power source operating state; and
holding the exhaust valve device in the second position in response to the electric power source operating state being a starting state.

6. The method of claim 5, further comprising:
determining an output value of an alternator of the electric power source;
determining a limit switch condition;
determining the primary internal combustion engine operating condition; and
continuing to hold the exhaust valve device in the second position in response to: the output value of the alternator, the limit switch condition indicating the exhaust routing device is fully in the second position, and the primary internal combustion engine operating condition indicating the primary internal combustion engine is off.

7. The method of claim 5, further comprising providing a first limit switch that determines whether the exhaust valve device is fully in the first position, determining whether a control condition indicates the exhaust valve device should be in the first position, and providing a fault indicator in response to the control condition indicating the exhaust valve device should be in the first position and the first limit switch indicating the exhaust valve device is not fully in the first position.

8. The method of claim 5, further comprising providing a second limit switch that determines whether the exhaust valve device is fully in the second position, determining whether a control condition indicates the exhaust valve device should be in the second position, and providing a fault indicator in response to the control condition indicating the exhaust valve device should be in the second position and the second limit switch indicating the exhaust valve device is not fully in the second position.

9. An apparatus, comprising:
a first internal combustion engine to provide vehicular propulsion;
a first exhaust passageway coupled to the first engine;
an electric power generator;

a second internal combustion engine to drive the generator to produce electricity;

a second exhaust passageway coupled to the second engine;

an emission treatment device including an exhaust inlet to treat exhaust from the first engine and the second engine; and an exhaust valve device to route exhaust to the exhaust inlet from each of the first passageway and the second passageway through an emissions reduction device, wherein the exhaust valve device is structured to block fluid communication between the emissions reduction device and the second passageway when the first engine is operating and to block the fluid communication between the emissions reduction device and the first passageway when the second engine is operating.

10. The apparatus of claim 9, wherein the exhaust valve device to route exhaust to the exhaust inlet from each of the first passageway and the second passageway through the emissions reduction device includes at least one valve, the apparatus further comprising a controller configured to determine the position of the at least one valve, and wherein the controller is configured to provide a fault indicator when the position of the at least one valve and a commanded position of the at least one valve are not in agreement.

11. The apparatus of claim 10, wherein the controller is configured to prevent operation of the second engine in response to the fault indicator.

12. A system, comprising:
a first internal combustion engine to provide vehicular propulsion;
a first exhaust passageway coupled to the first engine;
an electric power generator;
a second internal combustion engine to drive the generator to produce electricity;
a second exhaust passageway coupled to the second engine;
an emission treatment device including an exhaust inlet to treat exhaust from the first engine and the second engine; and
an exhaust valve device to selectively and alternately route exhaust to the exhaust inlet from each of the first passageway and the second passageway, the exhaust valve device being structured to at least partially close a corresponding selected one of the first exhaust passageway and the second exhaust passageway from fluid communication with the exhaust inlet when the exhaust valve device routes exhaust to the exhaust inlet from the other of the first passageway and the second passageway.

13. A system, comprising:
a first internal combustion engine to provide vehicular propulsion;
a first exhaust passageway coupled to the first engine;
an electric power generator;
a second internal combustion engine to drive the generator to produce electricity;
a second exhaust passageway coupled to the second engine;
an emission treatment device including an exhaust inlet to treat exhaust from the first engine and the second engine; and
an exhaust valve device to selectively route exhaust to the exhaust inlet from each of the first passageway and the second passageway, the exhaust valve device being structured to at least partially close a selected one of the first exhaust passageway and the second exhaust passageway from fluid communication with the exhaust inlet, wherein the exhaust valve device is structured to block the fluid communication between the exhaust inlet and the second passageway when the first engine is operating and to block the fluid communication between the exhaust inlet and the first passageway when the second engine is operating.

14. The system of claim 13, further comprising a vehicle carrying the first internal combustion engine, the electric power source, the emission treatment device, and the exhaust valve device.

15. The system of claim 13, wherein the emission treatment device comprises a particulate filter.

16. A system, comprising:
a first internal combustion engine to provide vehicular propulsion;
a first exhaust passageway coupled to the first engine;
an electric power generator;
a second internal combustion engine to drive the generator to produce electricity;
a second exhaust passageway coupled to the second engine;
an emission treatment device including an exhaust inlet to treat exhaust from the first engine and the second engine; and
an exhaust valve device to selectively route exhaust to the exhaust inlet from each of the first passageway and the second passageway, the exhaust valve device being structured to at least partially close a selected one of the first exhaust passageway and the second exhaust passageway from fluid communication with the exhaust inlet, wherein the exhaust valve device comprises an actuator structured to operate a first valve corresponding to the first passageway and a second valve corresponding to the second passageway.

17. The system of claim 16, wherein the actuator further comprises a first position wherein the first valve is open and the second valve is closed, and a second position wherein the first valve is closed and the second valve is open.

18. The system of claim 17, further comprising a first limit switch adapted to provide a first valve open signal in response to the first valve being fully open.

19. The system of claim 17, further comprising a second limit switch adapted to provide a second valve open signal in response to the second valve being fully open.

20. The system of claim 17, wherein the exhaust valve device further comprises a biasing means that moves the actuator to the first position as a default position, and the actuator includes a double acting ram.

* * * * *